(12) United States Patent
Booth et al.

(10) Patent No.: US 6,519,393 B2
(45) Date of Patent: Feb. 11, 2003

(54) COUPLING OF OPTICAL WAVEGUIDE TO OPTICAL WAVEGUIDE DEVICES

(76) Inventors: Bruce Lee Booth, 1669 Warpath Rd., West Chester, PA (US) 19382; Robert J. Furmanak, 4967 Homeville Rd., Cochranville, PA (US) 19330; Danahey Ryan, 528 Rock Run Rd., Port Deposit, MD (US) 21904

( * ) Notice: Subject to any disclaimer, the term of this patent is extended or adjusted under 35 U.S.C. 154(b) by 0 days.

(21) Appl. No.: 09/925,203

(22) Filed: Aug. 9, 2001

(65) Prior Publication Data

US 2002/0085812 A1 Jul. 4, 2002

Related U.S. Application Data

(60) Provisional application No. 60/224,131, filed on Aug. 10, 2000.

(51) Int. Cl.⁷ .............................. G02B 6/26; G02B 6/44
(52) U.S. Cl. ......................... 385/50; 385/39; 385/114
(58) Field of Search .......................... 385/50, 39, 114, 385/147

(56) References Cited

U.S. PATENT DOCUMENTS

| 4,609,252 | A | * | 9/1986 | Wong et al. ................. 385/130 |
| 4,637,681 | A | * | 1/1987 | Yamamoto et al. ........... 216/24 |
| 5,062,681 | A | * | 11/1991 | Furmanak et al. ............ 385/39 |
| 5,148,593 | A | * | 9/1992 | Walter .................... 174/102 D |
| 5,170,455 | A | * | 12/1992 | Goossen et al. ............ 385/146 |
| 5,359,686 | A | * | 10/1994 | Galloway et al. ............. 385/37 |
| 6,293,688 | B1 | * | 9/2001 | Deacon ...................... 362/551 |
| 6,404,960 | B1 | * | 6/2002 | Hibbs-Brenner et al. ..... 385/49 |
| 6,424,755 | B1 | * | 7/2002 | Clapp ........................ 385/129 |

* cited by examiner

Primary Examiner—Akm E. Ullah
Assistant Examiner—Tina M Lin

(57) ABSTRACT

An optical waveguide device adaptable to be coupled with one or more similar optical waveguide devices through commensurate slots on the devices, the slots guiding the ends of the respective waveguides into contact with each other, and into properly aligned optical coupling.

20 Claims, 7 Drawing Sheets

COUPLING OF OPTICAL WAVEGUIDE TO OPTICAL WAVEGUIDE DEVICES

CLAIM OF PRIORITY

Priority of Provisional Application No. 60/224,131, filed Aug. 10, 2000 is claimed.

FIELD OF THE INVENTION

This invention relates to improved optical waveguide devices capable of being coupled with each other through matching slots on each device. The incorporation of a mirror or a partially reflective surface within the device facilitates cascading the device with other waveguide structures to form an optical bus structure. The instant invention also relates to methods of making such optical devices.

BACKGROUND OF THE INVENTION

Optical communication systems offer several advantages over other wire-based communication systems for transmitting messages. These advantages include greatly increased bandwidth and channel capacity of communication and the ability to use lower cost, smaller, lighter weight materials compared to large, heavy, expensive copper cables.

As the development of optical circuits proceeded, it became necessary to have optical waveguide devices which could couple, divide, switch and modulate the optical waves from one optical fiber to another, or from one waveguide device to another. For example devices see U.S. Pat. Nos. 3,689,264, 4,609,252 and 4,637,681.

Connecting optical devices to one another has traditionally been a problem. One method is to fuse or melt fibers or other waveguide configurations, for example, together so that light from one fiber or waveguide can pass to the connected fibers or waveguides. However, in such a fusion process it is difficult to control the extent of fusion and the exact geometry and reproducibility of the final structure. Significant loss of signal can result.

U.S. Pat. No. 5,292,620 teaches a method of fabricating buried waveguides in a laminated multi-layered polymer structure, the disclosure of which is incorporated herein by reference. U.S. Pat. No. 5,394,495 discloses optical waveguide connectors for coupling light signals between multiple waveguides in one or more stacked planar multi-layer polymer waveguide structures using the fabrication method of U.S. Pat. No. 5,292,620.

U.S. Pat. No. 5,062,681 utilizes matching slots, symmetrically disposed around waveguides formed in a generally planar multilayer polymer structure to precisely couple waveguides to optical devices, the disclosure of which is also incorporated herein by reference.

SUMMARY OF THE INVENTION

The instant invention is directed to improved optical waveguide devices of the type capable of being coupled with each other through matching slots on each device. In each embodiment of the present invention the optical waveguide device preferably comprises a laminate of a middle photopolymer layer containing a waveguide, and at least one pair of external photopolymer layers each having the same thickness.

A first embodiment comprises a twisted multi-ribbon waveguide connector assembly having slots for connection to a corresponding slotted waveguide device. In the first embodiment multiple parallel waveguides are formed in a laminated multi-layer planar structure and slots are ablated symmetrically about one end of each waveguide. The multi-layer planar waveguide structure is then slit into individual ribbons in the vicinity of the slotted ends to form a first group of ribbons, so that each ribbon contains at least one waveguide. The slotted end of each ribbon is then twisted ninety degrees and inserted into a cavity in a housing, such that each slotted end protrudes out of the housing, to form an optical connector. Each ribbon is attached to the housing by suitable attachment means. A photo-curable adhesive or a molding resin is preferably injected into the cavity of the housing and cured. Alternatively, the housing may be configured to clamp the slotted ends of the ribbons in place in the housing. The spacing of the slotted ends in the connector is chosen to match the spacing of corresponding slotted waveguide ends in a second connector having a group of waveguides that are arranged in a generally planar array. The slotted ends of the first group of waveguides in the optical connector may then be joined to the corresponding slotted ends of waveguides of the second group. The corresponding slotted ends facilitate the alignment of the waveguides of the first group with the waveguides of the second group.

More particularly, this first embodiment of the invention pertains to a first slotted optical waveguide device comprising an interior portion and a first plurality of exterior ribbon portions, each ribbon having a central axis therethrough and containing a waveguide along the ribbon axis, the ribbon being adaptable to be connected to a second slotted optical waveguide device, each ribbon portion of the first device comprising: a terminal edge; a first pair of opposite external surfaces, substantially parallel to each other, and extending away from the terminal edge; and a waveguide positioned equidistantly between the first pair of the opposite external surfaces, the waveguide having an end point and a center axis, the center axis coinciding with the central axis of the ribbon, the center axis forming a substantially right angle to the terminal edge; the ribbon also having a thickness, and a through-slot extending in a direction substantially parallel to the direction of the waveguide, the through-slot starting at the terminal edge and extending adequately within the ribbon as to meet the end of the waveguide, the through-slot having a width, and a center axis coinciding with the center axis of the waveguide, the through-slot confined by a second pair of opposite side surfaces, substantially parallel to each other and to the center axis of the waveguide, and substantially perpendicular to the first pair of surfaces with the requirement that the width of the through-slot is not excessively smaller than the thickness of the second matching optical waveguide device; and an internal surface meeting with and being substantially perpendicular to the first and the second pairs of surfaces, the internal surface having a center point, the center point coinciding with the end of the waveguide, the terminal edge end of the ribbon being twisted substantially ninety degrees from the interior portion so that when the through-slot of the optical waveguide device is coupled with a similar slot of the second device, wherein the slots of the second device lie in a common plane (i.e., not twisted), the ends of the respective waveguides come in contact, and the center axes of the waveguides substantially coincide.

Preferably, the width of the through-slot is adequately smaller than the thickness of the device, so that when the optical waveguide device is connected to a similar device through coupling of their respective through-slots, a tight and secure fit is created.

A second embodiment of the waveguide device of the present invention is a waveguide connector assembly, arranged for coupling both to a second waveguide device and to a third waveguide device. In the second embodiment a waveguide is formed in a laminated multi-layer planar structure which is generally rectangular in shape, the waveguide being comprising a first segment and a second segment, the first and second segments being disposed substantially orthogonal to each other.

The first waveguide segment has a first terminal end and a second interior end, the second segment has a first terminal end and a second interior end. A central mirror is positioned so that light from the interior end of the first waveguide segment is reflected into interior end of the second waveguide segment. A slot cavity is formed in a central region of the device, preferably by ablation, the cavity being positioned so that a first planar surface of the cavity intersects each of the two waveguide segments at an acute angle, preferably at about a forty five degree angle. A mirror may be inserted into the cavity at the surface of the cavity that intersects the waveguides. Alternatively the surface of the cavity that intersects the waveguides may be coated with a suitable material to form a mirror. Each terminal end of the waveguide segments is slotted, the slotted ends being disposed substantially orthogonal to each other.

The slotted end of the first waveguide segment in the waveguide device may then be joined to a corresponding slotted end of a respective waveguide in a second slotted waveguide device and the slotted end of the second waveguide segment in the waveguide device may then be joined to a corresponding slotted end of a respective waveguide in a third slotted waveguide device.

A third embodiment of the waveguide device of the present invention is suitable for coupling to a second waveguide device, to a third waveguide device, and to a fourth waveguide device. In the third embodiment a branched three segment waveguide is formed in a multi-layer planar structure, generally rectangular in shape, the waveguide comprising a first segment having a first terminal end and a second interior end, a second segment having a first terminal end and a second interior end, a third segment having a first terminal end and a second interior end. A partially reflecting central mirror is positioned to receive light from the first segment so that part of the light from the first waveguide segment is reflected by the mirror into the second waveguide segment and part of the light from the first waveguide segment passes through the mirror into the third waveguide segment. A slot cavity is formed in a central region of the device, preferably by ablation, the cavity being positioned so that one surface of the cavity intersects each of the interior ends of the three waveguide segments at an acute angle, preferably at about a forty five degree angle. A partially reflecting mirror may be inserted into the cavity at the surface of the cavity that intersects the waveguides.

Alternatively the surface of the cavity that intersects the waveguides may be coated with a suitable material to form the partially reflecting mirror surface. Each terminal end of the three waveguide segments are slotted, the slotted ends of the first waveguide segment and third waveguide segment each being disposed substantially orthogonal to the second waveguide segment.

A fourth embodiment of the waveguide device of the present invention is suitable for coupling to a second waveguide device, to a third waveguide device, and to a fourth waveguide device and switching light from the second waveguide device to the third waveguide device or to the fourth waveguide device. In the fourth embodiment a branched three segment waveguide is formed in a multi-layer planar structure, generally rectangular in shape, the waveguide comprising a first waveguide segment having a first terminal end and a second interior end, a second waveguide segment having a first terminal end and a second interior end, and a third waveguide segment having a first terminal end and a second interior end.

A reflecting central mirror, movable between a first position and a second position, is positioned in a central slot cavity to receive light from the first segment. When the central mirror is in the first position the light from the first waveguide segment is reflected by the mirror into the second waveguide segment. When the central mirror is in the second position the light from the first waveguide segment passes by the mirror into the third waveguide segment. A slot cavity is formed in a central region of the device, preferably by ablation, the cavity being positioned so that one surface of the cavity intersects each of the interior ends of the three waveguide segments at an acute angle, preferably at about a forty five degree angle. The mirror may be inserted into the cavity at the surface of the cavity that intersects the waveguides and may be moved by any suitable means.

Alternatively the cavity that intersects the waveguides may be partially filled with a suitable liquid material to form the reflecting mirror surface, such that an air bubble remains in the cavity. Each terminal end of the three waveguide segments are slotted, the slotted ends of the first waveguide segment and third waveguide segment each being disposed substantially orthogonal to the second waveguide segment.

The instant invention also relates to methods of making such optical devices. More particularly it pertains to a first method of coupling two optical waveguide devices, a second method of coupling two optical waveguide devices and a third method of coupling three optical waveguide devices. In the first method each optical device having a terminal edge, a first pair of opposite surfaces substantially parallel to each other, and a waveguide positioned equidistantly between the opposite surfaces, the waveguide having a center axis forming a substantially right angle with the terminal edge, comprising the steps of: forming a through-slot in a direction substantially parallel to the direction of the waveguide, the through-slot starting at the terminal edge of each device and extending adequately within the device to remove at least part of the waveguide and form an end on the waveguide, in a way that the through-slot has a center axis coinciding with the center axis of the waveguide, and a second pair of opposite side surfaces, substantially parallel to each other and to the center axis of the waveguide, and substantially perpendicular to the first pair of surfaces with the requirement that the width of the through-slot is not excessively smaller than the thickness of the device, and an internal surface meeting with and being perpendicular to the second pair of surfaces, the internal surface having a center point, the center point coinciding with the end of the waveguide, slitting the multilayer waveguide structure into ribbons, twisting the ribbons substantially ninety degrees, and inserting the slotted ends into a housing. The slotted end of one device is inserted into a similar slot of a second device in a way that the ends of the respective waveguides come in contact, and the center axes of the waveguides substantially coincide. When a permanent connection of two waveguide devices is desired it is preferable to adhere the respective waveguide ends of the two devices to each other with an adhesive photopolymer composition.

DESCRIPTION OF THE DRAWINGS

The invention will be more fully understood from the following detailed description, taken in connection with the accompanying drawings which form a part of this application in which.

DETAILED DESCRIPTION OF THE INVENTION

Figure 1:
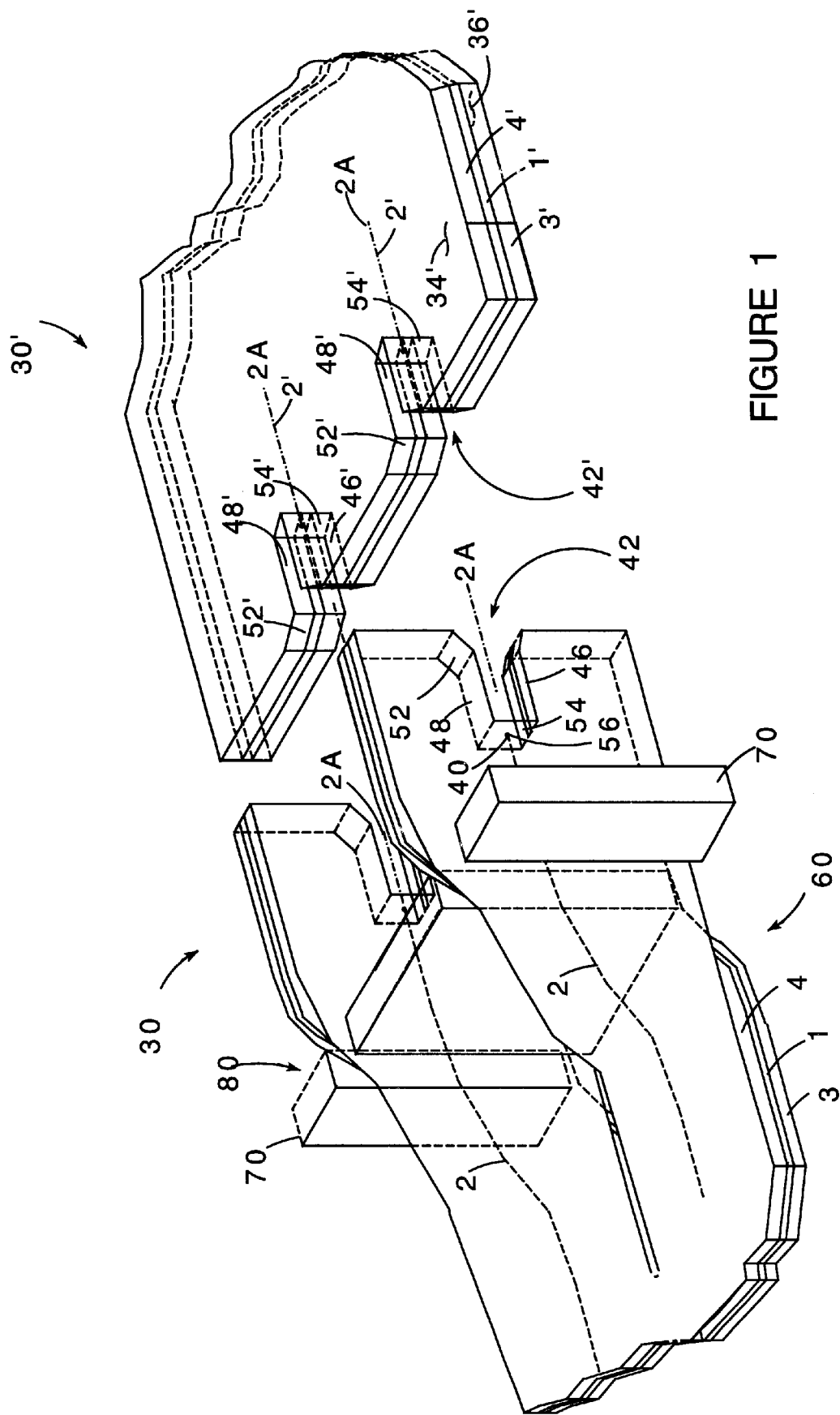
FIG. 1 is a perspective view of a first embodiment.

This invention pertains to optical waveguide devices capable of being coupled with each other through special matching slots on each device. This greatly facilitates the alignment of the waveguides embedded in different devices and alleviates the need for accurate and very expensive equipment, which is otherwise required for the waveguide alignment. The instant invention also relates to methods of making such optical devices.

Although any type of optical waveguide devices having the waveguide embedded equidistantly from their outside surfaces may be used in accordance with this invention, the devices described in the detailed discussion of FIGS. 1–7 lend themselves to inherently more accurate positioning of a waveguide regarding the "equidistance" requirement, and therefore they are preferred. The through-slots, which are carved according to the instant invention on the optical waveguide devices are described in the discussion of FIG. 1.

It should be understood that although the Figures illustrate only elementary optical waveguide devices for simplicity purposes, the degree of complexity of the individual devices does not have adverse consequences with regard to the present invention.

Throughout the following detailed description, similar reference numerals refer to similar parts in all Figures of the drawing. In addition, the word "element" is used to denote a constituent of a final optical waveguide device.

Referring to FIG. 1, a twisted multi-ribbon waveguide connector assembly 30 having slots 42 for connection to a corresponding slotted waveguide device 30' having slots 42' is illustrated. An element is illustrated comprising a central substantially dry photohardenable film 1 containing one or more buried optical waveguides, preferably fabricated in accordance with the method of U.S. Pat. No. 5,292,620, laminated between a first outer substantially dry photohardenable film 3 and a second outer substantially dry photohardenable film 4. A first surface of the central film 1 is adhered to a corresponding surface of the outer film 2. A second surface of the central film 1 is adhered to a corresponding surface of the outer film 3.

The film 1 may have a thickness in the range of 2 micrometers through 15 micrometers or above, preferably in the range of 4.5 micrometers through 8.0 micrometers, and more preferably about 5.3 micrometers. The film 3 and 4 preferably are of the same thickness which may be in the range of 15 micrometers or above. The film 3 and 4 may be comprised of multiple layers.

All film layers can be made out of the same material as the film 1. Then the hardened device matrix is substantially homogeneous in composition and refractive index except in and near the waveguide 2. Preferably, however, after the hardening step, the waveguide has a refractive index about 0.005 and 0.060 greater than the hardened film and about 0.001 to 0.025 greater than the hardened layers. Of course, regardless of whether different materials are used for different layers and the film, the composition and refractive index in each exposed region is substantially homogeneous in composition and refractive index.

FIG. 1 illustrates in a perspective view an optical waveguide device 30 and a matching similar optical waveguide device 30', preferably both made according to the preceding discussion. The devices have similar configuration, and they are adaptable to be connected or coupled to each other. Device 30 has a terminal edge 32, and a first pair of opposite external surfaces 34 and 36, which are substantially parallel to each other, and they extend away from the terminal edge 32. There is provided also a waveguide 2, which should be positioned equidistantly between the first pair of opposite surfaces 34 and 36. The waveguide 2 has an end-point 40 and an optical or center axis A–A'. The center axis A–A' forms an angle with the terminal edge 32, which should have a value different than zero, and should preferably be a substantially right angle. The thickness of the optical device 30 is defined as the distance between the parallel and opposite surfaces 34 and 36.

The optical waveguide device 30 has also a through-slot 42 which extends in a general direction substantially parallel to the direction of the waveguide 2, which is the same as the direction of its center axis A–A'. As a matter of fact, the through-slot has a center axis (not shown) which coincides with the center axis A–A' of the waveguide 2. The through-slot 42 starts at the terminal edge 32, and it extends adequately within the device 30 as to meet the end point 40 of the waveguide 2. The slot 42 is confined by a second pair of opposite surfaces 46 and 48 which are in a general way substantially parallel to each other and to the center axis A–A' of the waveguide 2. It is required that the width of the through-slot, defined as the distance separating the opposite surfaces 46 and 48, may not be excessively smaller than the thickness of the matching device 30'. By this it is meant that the width of the slot must not be so much smaller than the thickness of the matching device 30' as to produce deleterious effects when it is inserted into a respective slot 42' of device 30'. Such deleterious effects may be breakage, cracking, excessive stress, misalignment, and the like, occurring to one or both devices. Although the width of the through-slot 42 may be larger than the thickness of the matching device 30', the primary advantage of this invention of automatically achieving outstanding alignment will be minimized. Thus, it is preferable that the width of the slot 42 equals the thickness of the matching device. It is more preferable that the thickness of the through-slot 42 is adequately smaller, in a trapezoidal manner, than the thickness of the matching device 30', so that when the optical waveguide device 30 is connected to the matching device 30' through coupling of their respective through-slots 42 and 42', a tight and secure fit is created. By "trapezoidal manner" it is meant that the through-slot 42 is slightly less wide in the region disposed towards the terminal edge 32 as compared to the region disposed toward the inside of the device 30. Two lips 50 and 52 may be provided for facilitating the insertion of one device into the other at their respective slots 42 and 42'. The lips may have rounded edges for easier insertion of one slot into another.

The through-slot 42 is also confined by an internal surface 54, which meets with and is perpendicular to both the first pair of surfaces 34 and 36, and to the second pair of surfaces 46 and 48. The internal surface 54 has a center point 56, which coincides with the end 40 of the waveguide 42.

In this manner, when the through-slot 42 of the optical waveguide device 30 is coupled with a similar slot 42' of the matching similar device 30', the ends 40 and 40' of the respective waveguides 2 and 2' come in contact, and the center or optical axes of the waveguides substantially coincide.

In this first embodiment multiple parallel waveguides are formed in a laminated multi-layer planar structure (comprising films 1, 3 and 4) and slots 42 are ablated symmetrically about one end E of each waveguide 2. The multi-layer planar waveguide structure is then slit into individual ribbons 60 in the vicinity of the slotted ends E to form a first group 70 of ribbons, so that each ribbon 60 contains at least one waveguide 2. The slotted end E of each ribbon 60 is then twisted ninety degrees and inserted into a cavity 80C in a housing 80, such that each slotted end E protrudes out of the housing, to form an optical connector 30. Each ribbon 60 is attached to the housing 80 by suitable attachment means 82. A photo-curable adhesive or a molding resin is preferably injected into the cavity 80C of the housing and cured. Alternatively, the housing 80 may be configured to clamp the slotted ends of the ribbons in place in the housing (not shown). The spacing of the slotted ends E in the connector 30 is chosen to match the spacing of corresponding slotted waveguide ends E' in a second connector 30' having a group 70' of waveguides 60' that are arranged in a generally planar array. The slotted ends E of the first group 70 of waveguides in the optical connector 30 may then be joined to the corresponding slotted ends E' of waveguides of the second group 70'. The corresponding slotted ends E facilitate the alignment of the waveguides 2 of the first group 70 with the waveguides 2 of the second group 70'.

More particularly, the slotted optical waveguide device 30 of this first embodiment comprises an interior portion I and a first plurality of exterior ribbon portions 60, each ribbon 60 having a central axis 60A therethrough and containing a waveguide 2 along the ribbon axis 60A, the ribbon being adaptable to be connected to a second slotted optical waveguide device 30', each ribbon portion 60 of the first device comprising: a terminal edge 32; a first pair of opposite external surfaces 34, 36, substantially parallel to each other, and extending away from the terminal edge 32; and a waveguide 2 positioned equidistantly between the first pair of the opposite external surfaces 34, 36, the waveguide 2 having an end point 2E and a center axis 2A, the center axis 2A coinciding with the central axis 60A of the ribbon 60, the center axis 2A forming a substantially right angle to the terminal edge 32; the ribbon 60 also having a thickness, and a through-slot 42 extending in a direction substantially parallel to the direction of the waveguide 2, the through-slot 42 starting at the terminal edge 30 and extending adequately within the ribbon 60 as to meet the end of the waveguide 2, the through-slot 42 having a width, and a center axis coinciding with the center axis of the waveguide, the through-slot confined by a second pair of opposite side surfaces 46, 48, substantially parallel to each other and to the center axis 2A of the waveguide, and substantially perpendicular to the first pair of surfaces 34, 36 with the requirement that the width of the through-slot is not excessively smaller than the thickness of the second matching optical waveguide device 30'; and an internal surface 54 meeting with and being substantially perpendicular to the first pair of surfaces 34, 36 and the second pairs of surfaces 46, 48, the internal surface 54 having a center point 56, the center point 56 coinciding with the end 2E of the waveguide 2, the terminal edge end 60E of the ribbon 60 being twisted substantially ninety degrees from the interior portion so that when the through-slot 42 of the optical waveguide device 30 is coupled with a similar slot 42' of the second device 30', wherein the slots 42' of the second device lie in a common plane (i.e., not twisted), the ends of the respective waveguides 2, 2' come in contact, and the center axes 2A, 2A' of the waveguides 2, 2' substantially coincide.

Preferably, the width of the through-slot 42 is adequately smaller than the thickness of the device 30, so that when the optical waveguide device is connected to a similar device 30' through coupling of their respective through-slots 42, 42', a tight and secure fit is created.

Figure 2:
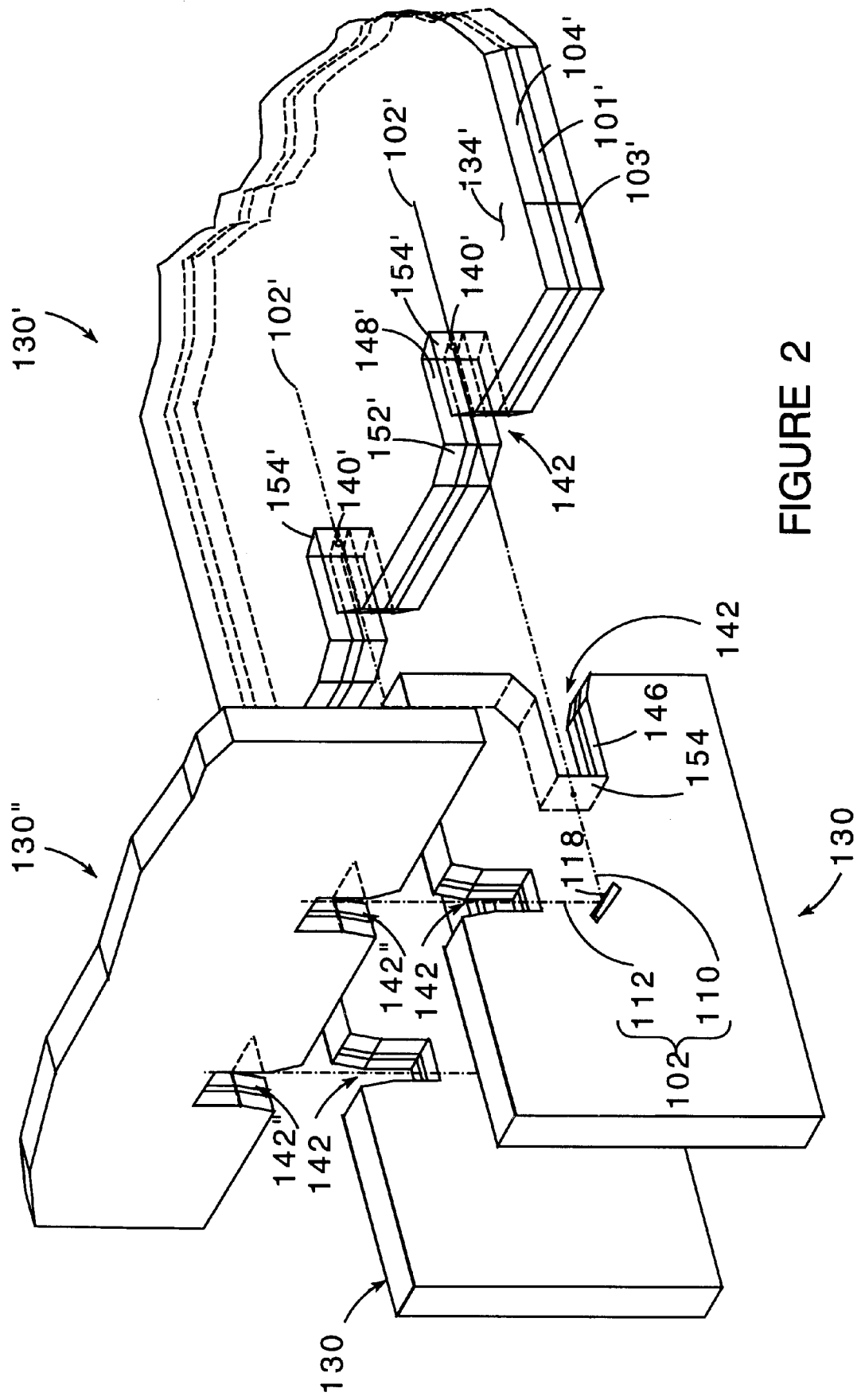
FIG. 2 is a perspective view of a second embodiment.
Figure 3:
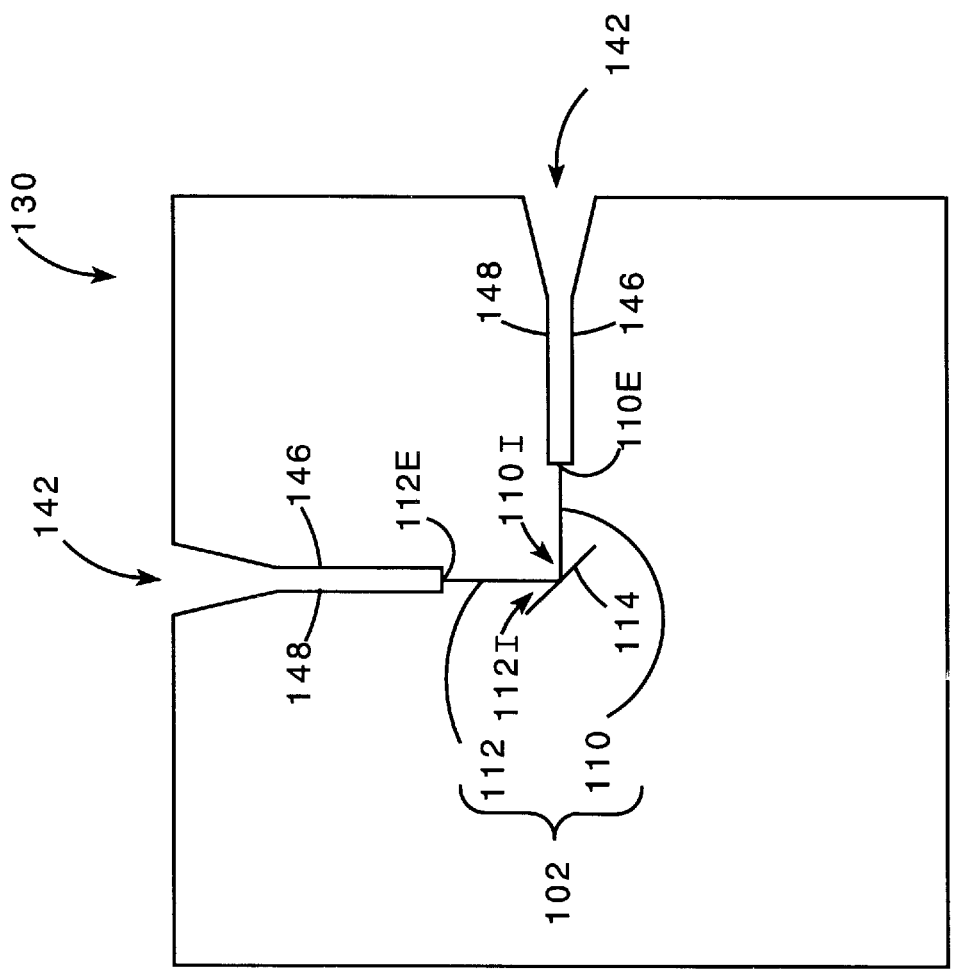
FIG. 3 is a sectional view of the second embodiment.

Referring to FIG. 2 and 3, a waveguide connector assembly 130, adapted for coupling both to a second waveguide device 130' and to a third waveguide device 130" is shown. In this second embodiment 130 a waveguide 102 is formed in a laminated multi-layer planar structure comprised of a central film 101 and a pair of outer film 103, 104. The device is generally rectangular in shape, the waveguide 102 being comprising a first segment 110 and a second segment 112, the first and second segments 110, 112 being disposed substantially orthogonal to each other.

The first waveguide segment 110 has a first terminal end 110E having a through slot 142 and a second interior end 110I, the second segment 112 has a first terminal end 112E having a through slot 142 and a second interior end 112I. A central mirror 114 is positioned so that light from the interior end 110I of the first waveguide segment 110 is reflected into interior end 112I of the second waveguide segment 112. A slot cavity 114 is formed in a central region of the device, preferably by ablation, the cavity being positioned so that a first planar surface 114S of the cavity intersects each of the two waveguide segments 110, 112 at an acute angle, preferably at about a forty five degree angle. A mirror M may be inserted into the cavity 114 at the surface of the cavity 114S that intersects the waveguide segments 110, 112. Alternatively the surface 114S of the cavity that intersects the waveguides 110, 112 may be coated with a suitable material to form a mirror 114M . Each terminal end 110E, 112E of the waveguide segments 110, 112 is slotted, the slotted ends 110E, 112E being disposed substantially orthogonal to each other.

The slotted end 110E of the first waveguide segment 110 in the waveguide device may then be joined to a corresponding slotted end 110E' of a respective waveguide in a second slotted waveguide device 130' and the slotted end 112E of the second waveguide segment 112 in the wavegiude device 130 may then be joined to a corresponding slotted end 112" of a respective waveguide in a third slotted waveguide device 130".

Figure 4:
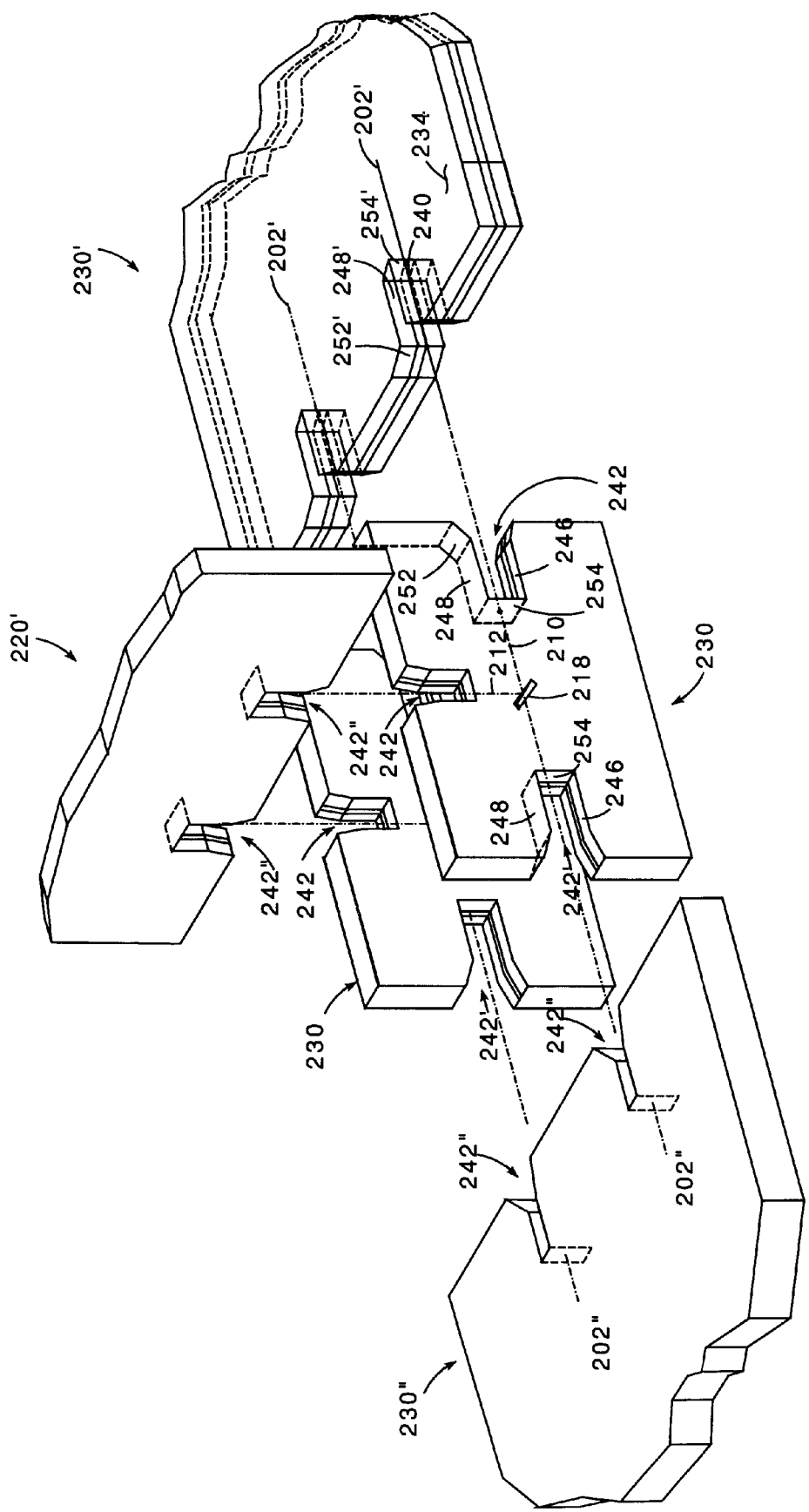
FIG. 4 is a perspective view of a third embodiment.
Figure 5:
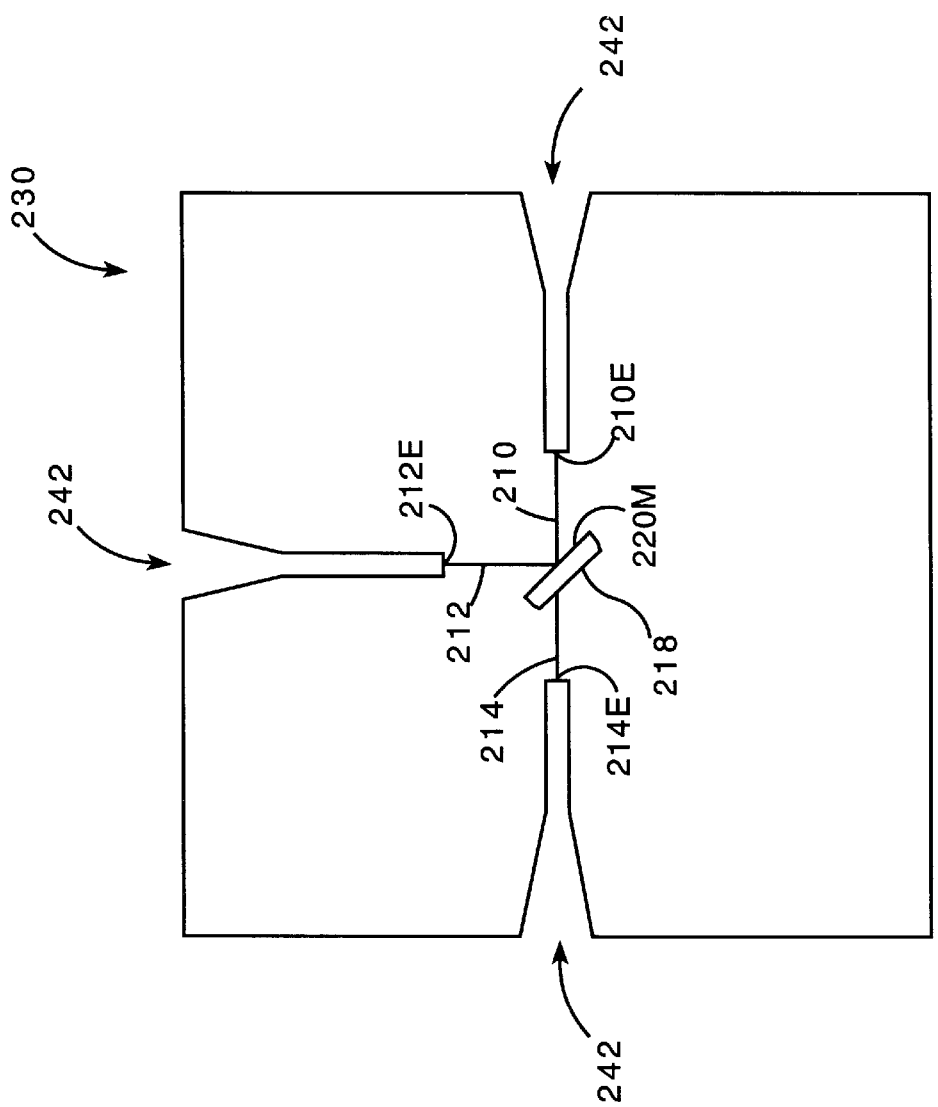
FIG. 5 is a sectional view of the third embodiment.

Referring to FIGS. 4 and 5 a waveguide device 230 adaptable for coupling to a second waveguide device 230', to a third waveguide device 230", and to a fourth waveguide device 230"'. In this embodiment a branched three-segment waveguide 202 is formed in a multi-layer planar structure comprised of a central film 201 and a pair of outer film 203, 204. The device 230 is generally rectangular in shape, the wavegiude 202 comprising a first segment 210 having a first terminal end 210E having a through slot 242 and a second interior end 210I, a second segment 212 having a first terminal end 212E having a through slot 242 and a second interior end 212I, a third segment 214 having a first terminal end 214E having a through slot 242 and a second interior end 214I. A partially reflecting central mirror 216 is positioned to receive light from the interior end 210I of the first waveguide segment 210 so that part of the light from the first waveguide segment 210 is reflected by the mirror 216 into the interior end 212I of the second waveguide segment 212 and part of the light from the interior end 210I of the first waveguide segment 210 passes through the mirror 216 into the interior end 214I of the third waveguide segment 214. A slot cavity 218 is formed in a central region of the device 230, preferably by ablation, the cavity being positioned so that one surface 218S of the cavity 218 intersects each of the interior ends 210I, 212I, 214I of the three waveguide segments at an acute angle, preferably at about a forty five degree angle. A partially reflecting mirror 220R may be inserted into the cavity 218 at the surface 218S of the cavity that intersects the waveguides 210, 212, 214.

Alternatively the surface 218S of the cavity that intersects the waveguides 210, 212, 214 may be coated with a suitable material to form the partially reflecting mirror surface 222R. Each terminal end 210E, 212E, 214E of the three waveguide segments 210, 212, 214 are slotted, the slotted ends 210E, 214E of the first waveguide segment 210 and third waveguide segment 214 each being disposed substantially orthogonal to the slotted end 212E of the second waveguide segment 212.

Figure 6:
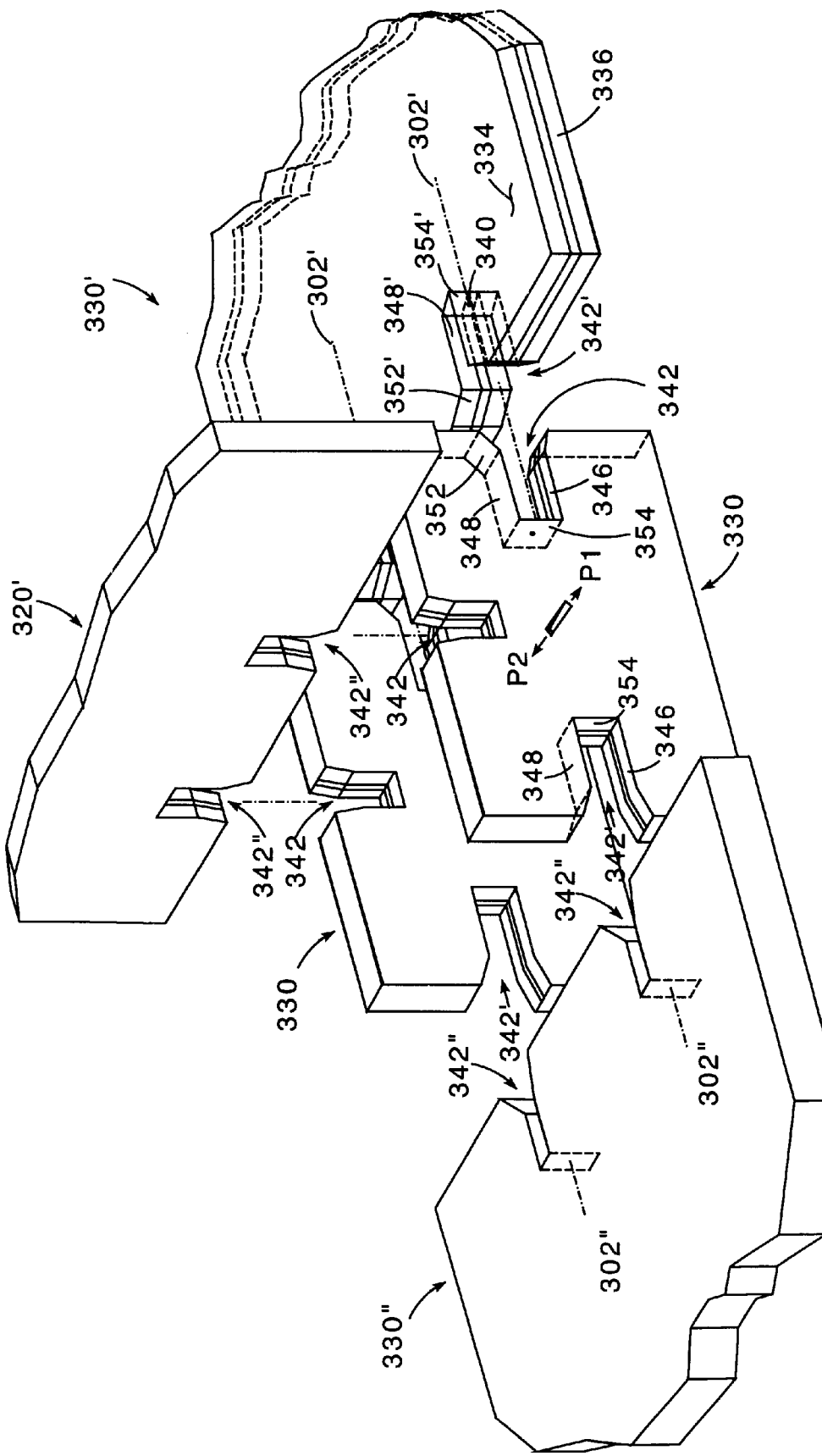
FIG. 6 is a perspective view of a fourth embodiment.
Figure 7:
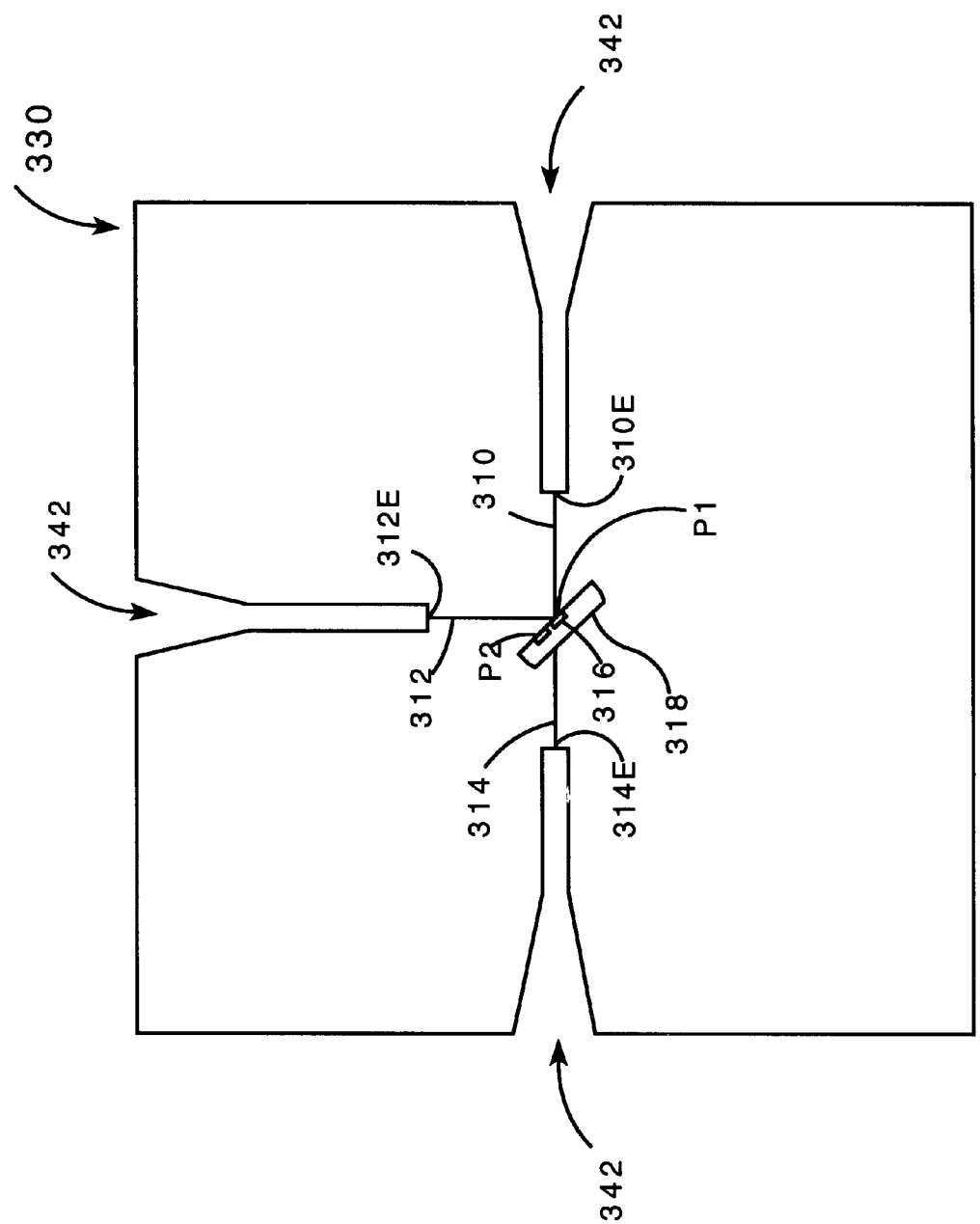
FIG. 7 is a sectional view of the fourth embodiment.

Referring to FIG. 6 and 7, a waveguide device 330 adaptable for coupling and switching light from a second waveguide device 330', to a third waveguide device 330", and to a fourth waveguide device 330''' is shown. In this embodiment a branched three-segment waveguide 302 is formed in a multi-layer planar structure, comprised of a central film 301 and a pair of outer film 303, 304. The device 330 is generally rectangular in shape, the waveguide 302 comprising a first waveguide segment 310 having a first terminal end 310E having a through slot 342 and a second interior end 310I, a second waveguide segment 312 having a first terminal end 312E having a through slot 342 and a second interior end 312I, and a third waveguide segment 314 having a first terminal end 314E having a through slot 342 and a second interior end 314I.

A reflecting central mirror 316, movable between a first position P1 and a second position P1, is positioned in a central slot cavity 318 to receive light from the interior end 310I of the first waveguide segment 310. When the central mirror 316 is in the first position P1 the light from the first waveguide segment 310 is reflected by the mirror 316 into the interior end 312I of the second waveguide segment 312. When the central mirror 316 is in the second position P2 the light from the first waveguide segment 310 passes by the mirror 316 into the the interior end 314I of the third waveguide segment 314. A slot cavity 318 is formed in a central region of the device 330, preferably by ablation, the cavity 318 being positioned so that one surface of the cavity intersects each of the interior ends 310I, 312I, 314I of the three waveguide segments at an acute angle, preferably at about a forty five degree angle. The mirror 316 may be inserted into the cavity 318 at the surface of the cavity 318S that intersects the waveguides 310, 312, 314 and may be moved by any suitable means, such as a mechanical actuator (not shown).

Alternatively the cavity 318 that intersects the waveguides may be partially filled with a suitable liquid material 320 to form a reflecting mirror surface 320M, such that gas bubble remains in the cavity 318. Each terminal end of the three waveguide segments are slotted, the slotted ends of the first waveguide segment and third waveguide segment each being disposed substantially orthogonal to the second waveguide segment.

It is preferable that the through-slots 42, 142, 242, 342 and the interior cavities 118, 218, 318 be ablated by the use of a laser, and more preferably by an excimer laser. The preferred method, as taught in U.S. Pat. No. 5,062,681, for providing excimer ablated fiber channels for passive (without need of alignment equipment) coupling involves a computer controlled image processing and positioning system. The excimer laser is masked by a rectangular aperture and is projected onto the optical waveguide device though a 15× reduction lens.

The rectangular aperture's width is adjusted until the correct channel width for passive coupling is achieved. For preferred present applications, this width is ~112 $\mu$m wide (as measured by the computer) at the optical waveguide device plane. A "sample" channel is created away from the work area. This sample channel is digitized and analyzed for width; the center and angular orientation is determined by the image processing system, then this image is stored as the reference that will be used to align all of the waveguides. At this point a waveguide is brought into the field of view and the optical waveguide device is aligned laterally and rotationally, iteratively, until within tolerance of the reference channel alignment (+/– 0.5 $\mu$m laterally, +/– 0.25 degrees rotationally). Then the actual channel to this waveguide is ablated; fluence ~2.5 J/cm$^2$, repetition rate 10 Hz, 30 sec. This procedure is repeated using the stored reference fiber channel image on the rest of the waveguides to be processed.

The films 3,4, 103,104, 203,204, 303,304 may comprise photohardenable base and buffer layers, which may be thermoplastic compositions which upon exposure to actinic radiation from crosslinks or polymers of high molecular weight to change the refractive index and rheological character of the composition(s). Preferred photohardenable materials are photopolymerizable compositions, such as disclosed in U.S. Pat. No. 3,658,526 (Haugh) and more preferred materials are described U.S. Pat. Nos. 4,942,112, 5,098,803, and 5,260,149 (Monroe et al.). In these materials, free radical addition polymerization and crosslinking of a compound containing one or more ethylenically unsaturated groups, usually in a terminal position, hardens and insolubilizes the composition. The sensitivity of the photopolymerizable composition is enhanced by the photoinitiating system which may contain a component which sensitizes the composition to predetermined radiation sources, e.g., visible light. Conventionally a binder is the most significant component of a substantially dry photopolymerizable base or layer in terms of what physical properties the base or layer will have while being used in the invention. The binder serves as a containing medium for the monomer and photoinitiator prior to exposure, provides the base line refractive index, and after exposure contributes to the physical and refractive index characteristics needed for the base layer of buffer layer. Cohesion, adhesion, flexibility, diffusibility, tensile strength, in addition to index of refraction are some of the many properties which determine if the binder is suitable for use in the base layer or the buffer layer.

Dry base or layer photohardenable elements contemplate to be equivalent are photodimerizable or photocrosslinkable compositions such as disclosed in U.S. Pat. No. 3,526,504 (Celeste) or those compositions in which hardening is achieved by a mechanism other than the free radical initiated type identified above.

While the photopolymerizable base or layer is a solid sheet of uniform thickness it is composed of three major components, a solid solvent soluble preformed polymeric material, at least one liquid ethylenically unsaturated monomer capable of addition polymerization to produce a polymeric material with a refractive index substantially different from that of the performed polymeric material, or binder, and a photoinitiator system activatable by actinic radiation.

Although the base or layer is a solid composition, components interdiffuse before, during and after imaging exposure until they are fixed or destroyed by a final uniform treatment usually by a further uniform exposure to actinic radiation. Interdiffusion may be further promoted by incorporation into the composition of an otherwise inactive plasticizer.

In addition to the liquid monomer, the composition may contain solid monomer components capable of interdiffusing in the solid composition and reacting with the liquid monomer to form a copolymer with a refractive index shifted from that of the binder.

As taught by U.S. Pat. No. 5,292,620, in the preferred compositions for use as the base layer or buffer layers in this invention, the preformed polymeric material and the liquid monomer are selected so that either the preformed polymeric material or the monomer contains one or more moieties taken from the group consisting essentially of substituted or unsubstituted phenyl, phenoxy, naphthyl, naphthyloxy, heteroaromatic groups containing one to three aromatic rings, chlorine, and bromine and wherein the remaining component is substantially free of the specified moieties. In the instance when the monomer contains these moieties, the photopolymerizable system hereinafter is identified as a "Monomer Oriented System" and when the polymeric material contains these moieties, the photopolymerizable system hereinafter is identified as a "Binder Oriented System."

The stable, solid, photopolymerizable compositions preferred for this invention will be more fully described by reference to the "Monomer Oriented System" and "Binder Oriented System." The Monomer Oriented System is preferred for the base layer.

The monomer of the Monomer Oriented System is a liquid, ethylenically unsaturated compound capable of addition polymerization and having a boiling point above 100° C. The monomer contains either a phenyl, phenoxy, naphthyl, naphthoxy, heteroaromatic group containing one to three aromatic rings, chlorine or bromine. The monomer contains at least one such moiety and may contain two or more of the same or different moieties of the group, provided the monomer remains liquid. Contemplated as equivalent to the groups are substituted groups where the substitution may be lower alkyl, alkoxy, hydroxy, carboxy, carbonyl, amino, amido, imido or combinations thereof provided the monomer remains liquid and diffusible in the photopolymerizable layer.

Preferred liquid monomers for use in the Monomer Oriented System of this invention are 2-phenoxyethyl acrylate, 2-phenoxyethyl methacrylate, phenol ethoxylate acrylate, 1-(p-chlorophenoxy) ethyl, p-chlorophenyl acrylate, phenyl acrylate, 1-phenylethyl acrylate, di(2-acryloxyethyl) ether of bisphenol-A, and 2-(2-naphthyloxy) ethyl acrylate.

While monomers useful in this invention are liquids, they may be used in admixture with a second solid monomer of the same type, e.g., N-vinyl-carbazole, ethylenically unsaturated carbazole monomers such as disclosed in *Journal of Polymer Science: Polymer Chemistry Edition*, Vol. 18, pp. 9–18 (1979) by H. Kamagawa et al., 2-naphthyl acrylate, penta-chlorophenyl acrylate, 2,4,6-tribromophenyl acrylate, and bisphenol A diacrylate, 2-(2-naphthyloxy) ethyl acrylate, and N-phenyl maleimide.

The solvent soluble polymeric material or binder of the Monomer Oriented System is substantially free of phenyl, phenoxy, naphthyl, naphthyloxy, heteroaromatic group containing one to three aromatic rings, chlorine and bromine. Preferred binders for use in the Monomer Oriented system of this invention are cellulose acetate butyrate polymers; acrylic polymers and inter polymers including polymethyl methacrylate, methyl methacrylate/methacrylic acid and methylmethacrylate/acrylate acid copolymers, terpolymers of methylmethacrylate/$C_2$–$C_4$ alkyl acrylate or methacrylate/acrylic or methacrylic acid; polyvinyl-acetate; polyvinyl acetal, polyvinyl butyral, polyvinyl ormal; and as well as mixtures thereof.

The monomers of the Binder Oriented System is a liquid ethylenically unsaturated compound capable of addition polymerization and having a boiling point above 100° C. The monomer is substantially free of moieties taken from the group consisting essentially of phenyl, phenoxy, naphthyl, naphthyloxy, heteroaromatic group containing one to three aromatic rings, chlorine and bromine.

Preferred liquid monomers for use in Binder Oriented Systems of this invention include decanediol diacrylate, iso-bornyl acrylate, triethylene glycol diacrylate, diethyleneglycol diacrylate, triethylene glycol dimethacrylate, ethoxyethoxyethyl acrylate, triacrylate ester of ethoxylated trimethylolpropane, and 1-vinyl-2-pyrrolidinone.

While monomers used in Binder Oriented Systems are liquids, they may be used in admixture with a second solid monomer of the same type, e.g., N-vinyl-caprolactam.

The solvent soluble polymeric material or binder of the Binder Oriented system contains in its polymeric structure moieties taken from the group consisting essentially of phenyl, phenoxy, naphthyl naphthyloxy or heteroaromatic group containing one to three aromatic rings as well as chloro or bromo atoms. Contemplated as equivalent to the groups are substituted groups where the substitution may be lower alkyl, alkoxy, hydroxy, carboxy, carbonyl, amido, imido or combinations thereof provided the binder remains solvent soluble and thermoplastic. The moieties may form part of the monomeric units which constitute the polymeric binder or may be grated onto a pre-prepared polymer or interpolymer. The binder of this type may be a homopolymer or it may be an interpolymer of two or more separate monomeric units wherein at least one of the monomeric units contains one of the moieties identified above.

Preferred binders for use in the Binder Oriented System include polystyrene, poly (styrene/acrylo-nitrile), poly (styrene/methyl methacrylate), and polyvinyl benzal as well as admixtures thereof.

The same photoinitiator system activatable by actinic radiation may be used in either the Monomer Oriented System or the Binder Oriented System. Typically the photoinitiator system will contain a photoinitiator and may contain a sensitizer which extends the spectral response into the near U.V. region and the visible spectral regions.

Preferred photoinitiators include CDM-HABI, i.e., 2-(o-chlorophenyl)-4,5-bis(m-methoxyphenyl)-imidazole dimer; o-Cl-HABI, i.e., 1,1'-biimidazole, 2,2'-bis-(o-chlorophenyl)-4,4',5,5'-tetraphenyl-; and TCTM-HABI, i.e., 1H-imidazole, 2,5-bis(o-chlorophenyl)-4-3,4-dimethoxyphenyl-, dimer each of which is typically used with a hydrogen donor, e.g., 2-mercaptobenzoxazole.

Preferred sensitizers include the following:
DBC, i.e., Cyclopentanone, 2,5-bis-(diethylamino)-2-methylphenyl)methylene);
DEAW, i.e., Cyclopentanone, 2,5-bis-((4-(diethylamino)-phenyl)methylene); and
Dimethoxy-JDI, i.e., 1H-inden-1-one, 2,3-dihydro-5,6-dimethoxy-2-((2,3,6,7-tetrahydro-1H,5H-benzo[i,j] quinolizine-9-yl)-methylene)-.

The solid photopolymerizable compositions of this invention may contain a plasticizer. Plasticizers of this invention may be used in amounts varying from about 2% to about 20% by weight of the compositions preferably 5 to 15 wt. %.

Preferred plasticizers for use in simple cellulose acetate butyrate systems are triethyleneglycol dicaprylate, tetraethyleneglycol diheptanoate, diethyl adipate, Brij 30 and tris-(2-ethylhexyl)phosphate. Similarly, triethyleneglyco dicaprylate, diethyl adipate, Brij 30, and tris(2-ethylhexyl)-phosphate are preferred in "Monomer Oriented Systems" where cellulose acetate butyrate is the binder.

Other components in addition to those described above can be present in the photopolymerizable compositions in varying amounts. Such components include: ultraviolet radiation absorbing material, thermal stabilizers, hydrogen donors, oxygen scavengers and release agents.

Amounts of ingredients in the photopolymerizable compositions will generally be within the following percentage ranges based on total weight of the photopolymerizable layer: monomer, 5–50%, preferably 15–35%; initiator 0.1–10%, preferably 1–5%; binder, 25–75%, preferably 45–65%; plasticizer, 0–25%, preferably 5–15%; other ingredients 0–5%, preferably 1–4%.

The above discussion of the operation of the instant invention have been given for illustration purposes only, and should not be construed as restricting the scope or limits of this invention in any way other than is recited in the appended claims.

What is claimed is:

1. A slotted optical waveguide device comprising an interior portion and a first plurality of exterior ribbon portions, each ribbon having a central axis therethrough and containing a waveguide along the ribbon axis, the ribbon being adaptable to be connected to a matching second slotted optical waveguide device, each ribbon portion of the first device comprising:

a terminal edge;

a first pair of opposite external surfaces, substantially parallel to each other, and extending away from the terminal edge; and a waveguide positioned equidistantly between the first pair of the opposite external surfaces;

the waveguide having an end point and a center axis, the center axis coinciding with the central axis of the ribbon, the center axis forming a substantially right angle to the terminal edge;

the ribbon also having a thickness, and a through-slot extending in a direction substantially parallel to the direction of the waveguide, the through-slot starting at the terminal edge and extending adequately within the ribbon as to meet the end of the waveguide, the through-slot having a width, and a center axis coinciding with the center axis of the waveguide, the through-slot confined by a second pair of opposite side surfaces, substantially parallel to each other and to the center axis of the waveguide, and substantially perpendicular to the first pair of surfaces with the requirement that the width of the through-slot is not excessively smaller than the thickness of the second matching optical waveguide device; and an internal surface meeting with and being substantially perpendicular to the first pair of surfaces and the second pair of surfaces, the internal surface having a center point, the center point coinciding with the end of the waveguide;

the terminal edge end of the ribbon being twisted substantially ninety degrees from the interior portion, so that when the through-slot of the optical waveguide device is coupled with a similar slot of the second device, wherein the slots of the second device lie in a common plane (i.e., not twisted), the ends of the respective waveguides come in contact, and the center axes of the waveguides substantially coincide.

2. An optical waveguide device as defined in claim 1, wherein the width of the slot is substantially equal to the thickness of the matching device.

3. An optical waveguide device as defined in claim 1, wherein the width of the through-slot is adequately smaller in a trapezoidal manner than the thickness of the matching device, so that when the optical waveguide device is connected to the matching device through coupling of their respective through-slots, a tight and secure fit is created.

4. An optical waveguide device as defined in claim 1, comprising a laminate of a middle photopolymer layer containing the waveguide, and two external photopolymer layers having the same thickness.

5. A slotted waveguide connector device, arranged for coupling both to a second waveguide device and to a third waveguide device, comprising:

a waveguide being formed in a laminated multi-layer planar structure which is generally rectangular in shape having at least a first terminal edge and a second terminal edge, the waveguide being comprised of a first segment terminating at the first terminal edge and a second segment terminating at the second terminal edge, the first and second segments being disposed substantially orthogonal to each other, wherein the first waveguide segment has a first terminal end at a first terminal edge and a second interior end, the second segment has a first terminal end and a second interior end;

a slot cavity formed in a central region of the device, comprising a first planar surface, the cavity being positioned so that the first planar surface of the cavity intersects each of the two waveguide segments at an acute angle at a single point;

a central mirror disposed within the slot cavity and being positioned with respect to the first waveguide segment and the second waveguide segment so that light from the interior end of the first waveguide segment is reflected into interior end of the second waveguide segment, wherein each terminal end of the waveguide segments is slotted, the slotted end of the first waveguide segment being disposed for connection to a corresponding second slotted waveguide device and the slotted end of the second waveguide segment being disposed for connection to a corresponding third slotted waveguide device.

6. The waveguide device of claim 5 wherein the mirror is comprised of a reflective coating on the first planar surface of the slot cavity.

7. The waveguide device of claim 5 wherein the mirror is comprised of a mirror having a reflective coating positioned within the slot cavity.

8. The waveguide device of claim 5 wherein the mirror is positioned at about a forty five degree angle.

9. The waveguide device of claim 5 wherein the slot cavity is formed by ablation.

10. The waveguide device of claim 5, wherein the width of the through-slot is substantially equal to the thickness of the matching device.

11. The waveguide device of claim 5, comprising a laminate of a middle photopolymer layer containing the waveguide, and two external photopolymer layers having the same thickness.

12. A slotted waveguide connector device, adaptable for coupling to a second waveguide device, to a third waveguide device, and to a fourth waveguide device, comprising:

a branched three segment waveguide formed in a laminated multi-layer planar structure, generally rectangular in shape having at least a first terminal edge, a second terminal edge, and a third terminal edge, the waveguide being comprised of a first waveguide segment having a first terminal end and a second interior end, a second waveguide segment having a first terminal end and a second interior end, a third waveguide segment having a first terminal end and a second interior end;

a slot cavity formed in a central region of the device, comprising at least a first planar surface, the cavity being positioned so that the first planar surface of the cavity intersects each of the three waveguide segments at an acute angle at a single point;

a central mirror disposed within the slot cavity positioned to receive light from the first waveguide segment so that the light from the first waveguide segment is reflected by the mirror into the second waveguide segment or the light from the first waveguide segment passes the mirror into the third waveguide segment, wherein each terminal end of the waveguide segments is slotted, the slotted end of the first waveguide segment being disposed for connection to a corresponding second slotted waveguide device, the slotted end of the second waveguide segment being disposed for connection to a corresponding third slotted waveguide device, and the slotted end of the third waveguide segment being disposed for connection to a corresponding fourth slotted waveguide device.

13. The waveguide device of claim 12 wherein the mirror is a partially reflecting mirror so that part of the light from the first waveguide segment is reflected by the mirror into the second waveguide segment and part of the light from the first waveguide segment passes through the mirror into the third waveguide segment.

14. The waveguide device of claim 12 wherein the mirror is comprised of a reflective coating on the first planar surface of the slot cavity.

15. The waveguide device of claim 12 wherein the mirror is comprised of a mirror having a reflective coating positioned within the slot cavity.

16. The waveguide device of claim 12 wherein the mirror is positioned at about a forty five degree angle with respect to each waveguide segment.

17. The waveguide device of claim 12 wherein the slot cavity is formed by ablation.

18. The waveguide device of claim 12, comprising a laminate of a middle photopolymer layer containing the waveguide, and two external photopolymer layers having the same thickness.

19. The waveguide device of claim 12 wherein the mirror is a reflecting central mirror, disposed in the central slot cavity and movable between a first position and a second position by a suitable means, which receives light from the first waveguide segment so that when the central mirror is in the first position the light from the first waveguide segment is reflected by the mirror into the second waveguide segment and when the central mirror is in the second position the light from the first waveguide segment passes by the mirror into the third waveguide segment.

20. The waveguide device of claim 12 wherein the slot cavity that intersects the waveguides is partially filled with a suitable liquid material to form the reflecting central mirror, such that a gas bubble remains in the cavity, the liquid being movable between a first position and a second position by a suitable moving means, so that when the liquid is in the first position the light from the first waveguide segment is reflected by the liquid into the second waveguide segment and when the liquid is in the second position the light from the first waveguide segment passes through the gas bubble into the third waveguide segment.

* * * * *